United States Patent
Oh et al.

(10) Patent No.: US 6,609,013 B1
(45) Date of Patent: Aug. 19, 2003

(54) CODE DIVISION MULTIPLE ACCESS BASE TRANSCEIVER STATION WITH ACTIVE ANTENNAS

(75) Inventors: Chi Wook Oh, Kyoungki-do (KR); Hong Jun Park, Seoul (KR)

(73) Assignee: Hyundai Electronics IND. Co., Ltd., Kyoungki-do (KR)

( * ) Notice: Subject to any disclaimer, the term of this patent is extended or adjusted under 35 U.S.C. 154(b) by 0 days.

(21) Appl. No.: 09/518,494

(22) Filed: Mar. 3, 2000

(30) Foreign Application Priority Data

Mar. 12, 1999 (KR) ............................................. 99-8363
Mar. 12, 1999 (KR) ............................................. 99-8364

(51) Int. Cl.[7] .................................................. H04B 1/38
(52) U.S. Cl. ......................................... 455/562; 455/561
(58) Field of Search ................................ 455/562, 522, 455/561, 550, 88

(56) References Cited

U.S. PATENT DOCUMENTS

| | | | |
|---|---|---|---|
| 4,032,922 A | | 6/1977 | Provencher |
| 4,882,588 A | | 11/1989 | Renshaw et al. |
| 5,446,370 A | * | 8/1995 | Voight .......................... 455/550 |
| 5,675,285 A | | 10/1997 | Winters |
| 5,987,037 A | * | 11/1999 | Gans ............................ 370/480 |
| 6,222,503 B1 | * | 4/2001 | Gietema et al. .............. 280/642 |
| 6,356,771 B1 | * | 3/2002 | Dent ............................ 455/277.1 |
| 6,377,558 B1 | * | 4/2002 | Dent ............................ 342/354 |

* cited by examiner

Primary Examiner—Vivian Chin
Assistant Examiner—Tu X Nguyen
(74) Attorney, Agent, or Firm—R. Neil Sudol; Henry D. Coleman; William J. Sapone

(57) ABSTRACT

A base transceiver station with active antennas in a CDMA mobile communication system, comprising a transceiver installed indoors for up-converting a CDMA-modulated signal to be transmitted to a service subscriber and down-converting a signal received from the subscriber into an intermediate frequency signal, a divider installed indoors for dividing a forward channel signal from the transceiver into a plurality of sector-unit forward channel signals, a coupler for coupling a plurality of sector-unit reverse channel signals and transferring the resultant signal to the transceiver, an antenna interface unit installed indoors for appending a DC voltage to each of the sector-unit forward channel signals from the divider, transferring the resultant sector-unit forward channel signals to a Butler matrix, receiving the sector-unit reverse channel signals from the Butler matrix and transferring them to the coupler, and an active radio frequency module installed outdoors for radiating each beam forming signal from the Butler matrix at a predetermined beam width and predetermined orientation angle over the air, receiving the reverse channel signal from the subscriber, amplifying it and transferring the resultant signal to the Butler matrix.

16 Claims, 5 Drawing Sheets

CODE DIVISION MULTIPLE ACCESS BASE TRANSCEIVER STATION WITH ACTIVE ANTENNAS

BACKGROUND OF THE INVENTION

1. Field of the Invention

The present invention relates in general to a code division multiple access (CDMA) base transceiver station (BTS), and more particularly to a base transceiver station which comprises outdoor, multibeam active antennas with transmission/reception amplifiers.

The present invention further relates to a base transceiver station with active antennas, for varying the strength of a forward or reverse channel signal in every sector to vary a transmission coverage or reception coverage of the antennas.

2. Description of the Prior Art

In a CDMA mobile communication system such as a digital cellular system (DCS) or personal communication service system (PCS), generally, a base transceiver station comprises omnidirectional antennas or sector antennas installed outdoors, and a high-power amplifier and low-noise amplifier installed indoors. The high-power amplifier is connected to an antenna transmitter, and the low-noise amplifier is connected to an antenna receiver. Such a construction of the base transceiver station is shown in FIG. 1, herein.

FIG. 1 schematically shows the construction of a conventional single-sector base transceiver station in a CDMA mobile communication system.

As shown in FIG. 1, the base transceiver station comprises antennas 11, 12 and 13 installed outdoors, and a transmission/reception filters/low-noise amplifier circuit 20, high-power amplifier 30, transceiver shelf 40, global positioning system (GPS) receiver 50, digital shelf 60 and base station control processor 70, installed indoors.

In the conventional single-sector base transceiver station with the above-mentioned construction, on a forward link, an output signal from the transceiver shelf 40 is amplified by the high-power amplifier 30, filtered by a transmission filter in the transmission/reception filters/low-noise amplifier circuit 20 and then transmitted through the outdoor transmission antenna 11.

On a reverse link, signals are received through the outdoor reception antennas 12 and 13, filtered by a reception filter in the indoor transmission/reception filters/low-noise amplifier circuit 20, amplified to a predetermined level by a low-noise amplifier in the circuit 20 and then transferred to the transceiver shelf 40.

The transceiver shelf 40 acts to up-convert an intermediate frequency (IF) signal from the digital shelf 60 into an ultrahigh frequency (UHF) signal and to down-convert a received UHF signal into an IF signal.

The base station control processor 70 functions to control the entire operation of the base transceiver station. In particular, the base station control processor 70 collects alarm signals generated in the base transceiver station and sends them to a base station controller.

In the conventional base transceiver station of the CDMA mobile communication system, as mentioned above, the omnidirectional antennas or sector antennas are installed outdoors, and the high-power amplifier and low-noise amplifier are installed indoors. However, in the above-mentioned base transceiver station, as the indoor equipment and outdoor antenna part become more distant from each other, the high-power amplifier must have relatively high output power due to an increase in cable loss, resulting in economic losses. Further, such a cable loss may degrade a reception performance of the system.

Moreover, the high-power amplifier should be selectively applied depending on a distance between the indoor equipment and outdoor antenna part, resulting in an inconvenience in installing the base transceiver station.

SUMMARY OF THE INVENTION

Therefore, the present invention has been made in view of the above problems, and it is an object of the present invention to provide a base transceiver station which comprises outdoor, multibeam active antennas with transmission/reception amplifiers.

It is another object of the present invention to provide a base transceiver station for varying the strength of a forward or reverse channel signal in every sector to vary a transmission coverage or reception coverage of the antennas.

In accordance with the present invention, the above and other objects can be accomplished by a provision of a base transceiver station with active antennas in a CDMA mobile communication system, comprising a transceiver installed indoors for up-converting a CDMA-modulated signal to be transmitted to a service subscriber and down-converting a signal received from the subscriber into an intermediate frequency signal; a divider installed indoors for dividing a forward channel signal from the transceiver into a plurality of sector-unit forward channel signals; a coupler for coupling a plurality of sector-unit reverse channel signals and transferring the resultant signal to the transceiver; antenna interface means installed indoors for appending a DC voltage to each of the sector-unit forward channel signals from the divider, transferring the resultant sector-unit forward channel signals to a Butler matrix, receiving the sector-unit reverse channel signals from the Butler matrix and transferring them to the coupler; the Butler matrix being installed outdoors for making the sector-unit forward channel signals from the antenna interface means out of phase from one another to produce beam forming signals, converting a reverse channel signal into the sector-unit reverse channel signals and transferring them to the antenna interface means; and active radio frequency means installed outdoors for radiating each of the beam forming signals from the Butler matrix at a predetermined beam width and predetermined orientation angle over the air, receiving the reverse channel signal from the subscriber, amplifying it and transferring the resultant signal to the Butler matrix.

Preferably, the antenna interface means includes a power supply for converting an external commercial AC input voltage into a DC voltage to satisfy input conditions of the active radio frequency means; and first to third power/signal couplers for coupling the sector-unit forward channel signals from the divider with the DC voltage from the power supply, respectively.

Alternatively, the antenna interface means may include a power supply for converting an external commercial AC input voltage into a DC voltage desired by the active radio frequency means; a power control signal generator for communicating with indoor equipment to receive transmission/reception power control values therefrom and generating transmission/reception power control signals respectively according to the received power control values; transmission power control means for amplifying the sector-unit forward channel signals from the divider in response to the transmission power control signal from the power control signal generator, coupling each of the amplified sector-unit forward channel signals with the DC voltage from the power supply and transferring the resultant forward channel signals to the Butler matrix; and reception power control means for amplifying the sector-unit reverse channel signals from the Butler matrix in response to the reception power control signal from the power control signal generator and transferring the resultant reverse channel signals to the coupler.

Preferably, the transmission power control means includes first to third transmission power controllers, each of the transmission power controllers amplifying a corresponding one of the sector-unit forward channel signals from the divider in response to the transmission power control signal from the power control signal generator, coupling the amplified forward channel signal with the DC voltage from the power supply and transferring the resultant forward channel signal to the Butler matrix.

Each of the first to third transmission power controllers may include an amplifier for amplifying the corresponding sector-unit forward channel signal from the divider by a fixed gain; an attenuator for attenuating the amplified forward channel signal from the amplifier in response to the transmission power control signal from the power control signal generator; and a power/signal coupler for coupling the attenuated forward channel signal from the attenuator with the DC voltage from the power supply and transferring the resultant forward channel signal to the Butler matrix.

Preferably, the reception power control means includes first to third reception power controllers, each of the reception power controllers amplifying a corresponding one of the sector-unit reverse channel signals from the Butler matrix in response to the reception power control signal from the power control signal generator and transferring the amplified sector-unit reverse channel signal to the coupler.

Each of the first to third reception power controllers may include an amplifier for amplifying the corresponding sector-unit reverse channel signal from the Butler matrix by a fixed gain; and an attenuator for attenuating the amplified reverse channel signal from the amplifier in response to the reception power control signal from the power control signal generator and transferring the attenuated reverse channel signal to the coupler.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
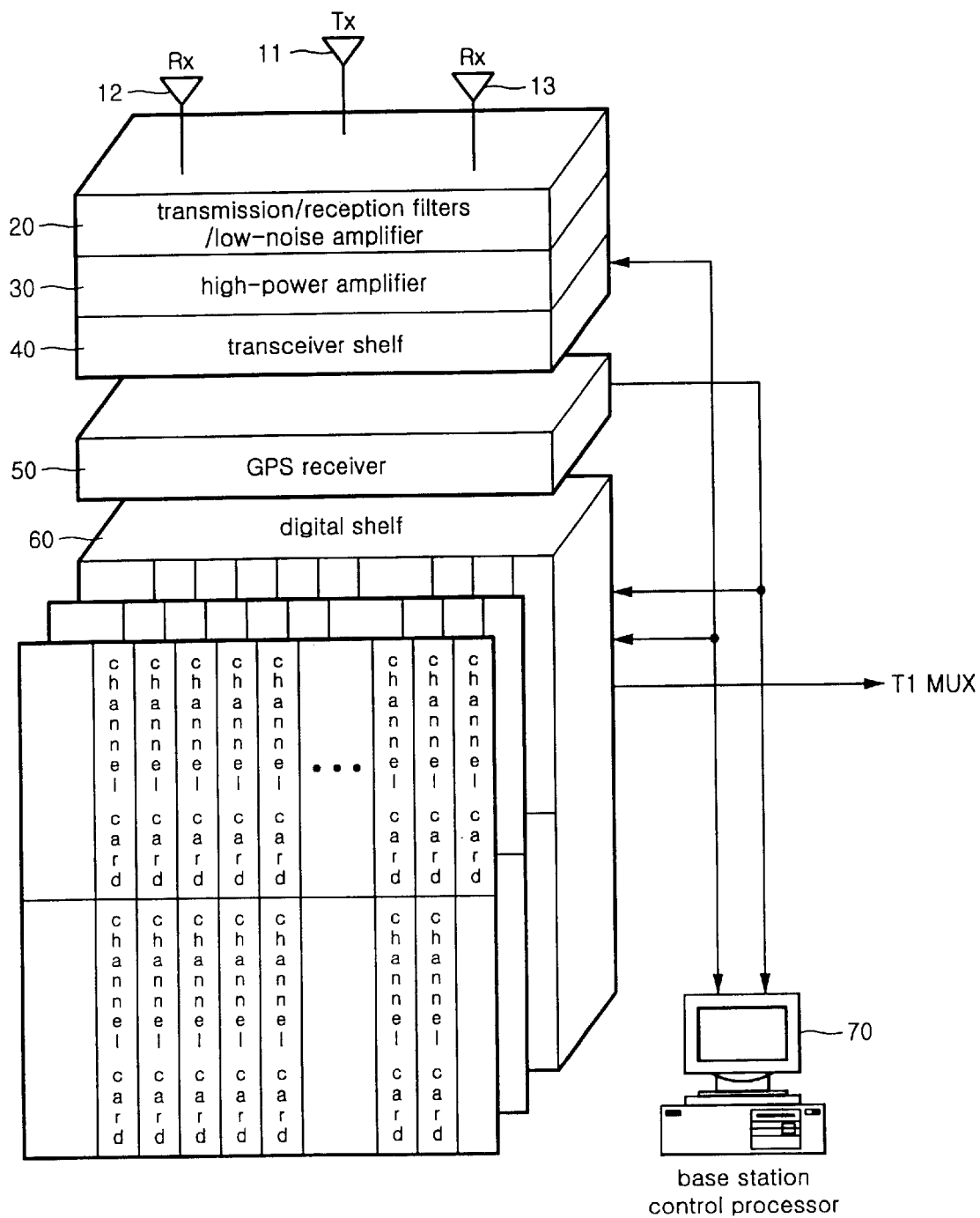
FIG. 1 is a view schematically showing the construction of a conventional base transceiver station in a CDMA mobile communication system.
Figure 2:
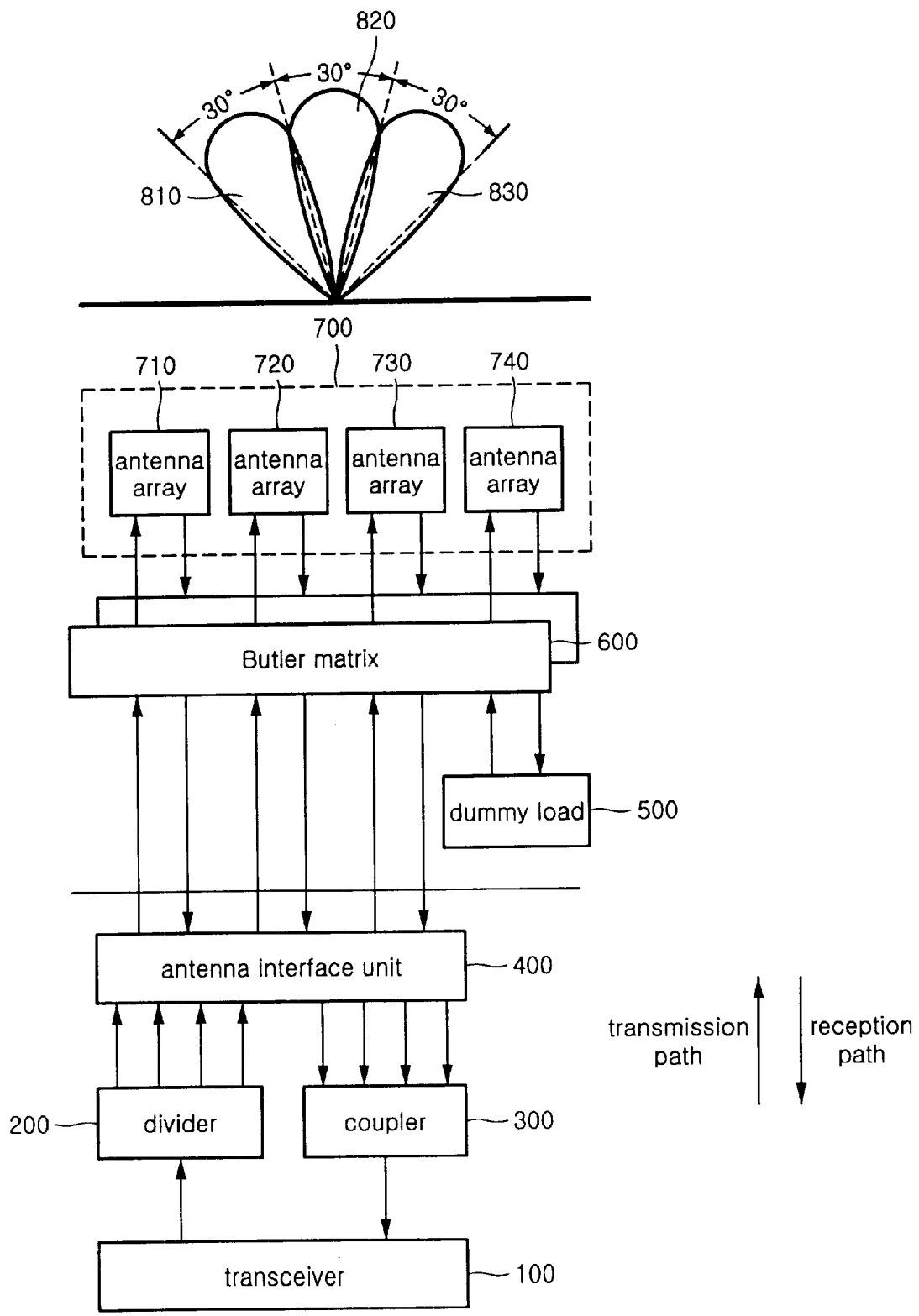
FIG. 2 is a block diagram of a base transceiver station with active antennas in accordance with the present invention.

With reference to FIG. 2, there is shown in block form the construction of a base transceiver station with active antennas in accordance with the present invention.

As shown in FIG. 2, a transceiver 100 is installed indoors to up-convert a CDMA-modulated signal to be transmitted to a service subscriber and to down-convert a signal received from the subscriber into an IF signal. A divider 200 is installed indoors to divide a forward channel signal from the transceiver 100 into a plurality of sector-unit forward channel signals. A coupler 300 is adapted to couple a plurality of sector-unit reverse channel signals from an antenna interface unit 400 and transfer the resultant signal to the transceiver 100. The antenna interface unit 400 is installed indoors to append a direct current (DC) voltage to each of the sector-unit forward channel signals from the divider 200 and transfer the resultant sector-unit forward channel signals to a Butler matrix 600. The antenna interface unit 400 is further adapted to receive the sector-unit reverse channel signals from the Butler matrix 600 and transfer them to the coupler 300. The Butler matrix 600 is installed outdoors to make the sector-unit forward channel signals from the antenna interface unit 400 out of phase from one another to produce beam forming signals. The Butler matrix 600 is further adapted to convert a reverse channel signal into the sector-unit reverse channel signals and transfer them to the antenna interface unit 400. An active radio frequency module 700 is also installed outdoors to radiate each of the beam forming signals from the Butler matrix 600 at a predetermined beam width and predetermined orientation angle over the air. The active radio frequency module 700 is further adapted to receive the reverse channel signal from the subscriber, amplify it and transfer the resultant signal to the Butler matrix 600.

The active radio frequency module 700 includes first to fourth antenna arrays 710, 720, 730 and 740 horizontally arranged to form a beam radiation pattern. Each of the first to fourth antenna arrays 710–740 is provided with transmission/reception antenna elements and transmission/reception amplifiers.

In FIG. 2, the reference numeral 500, not described, denotes a dummy load additionally connected to the Butler matrix 600, and the reference numerals 810, 820 and 830 denote three beams corresponding to alpha, beta and gamma sectors, respectively. Further in FIG. 2, the part above a solid line signifies outdoor equipment and the part under the solid line signifies indoor equipment.

Now, a detailed description will be given of the operation of the base transceiver station with the multibeam active antennas, constructed as mentioned above in accordance with the present invention. The operation of the base transceiver station is performed in different manners according to a forward link and reverse link and it will thus be hereinafter described separately with respect to the forward and reverse links.

First, on the forward link, the transceiver 100 up-converts data to be transmitted, or a CDMA-modulated IF signal of 4.95 Mhz, into a signal of a reception frequency (DCS: 869–894 Mhz and PCS: 1840–1870 Mhz) of a terminal of a service subscriber. Here, the CDMA-modulated IF signal contains components of three sectors, or alpha, beta and gamma sectors.

The up-converted signal, or forward channel signal, is transferred to the divider 200, which then divides it into three forward channel signals corresponding respectively to the three sectors, or alpha, beta and gamma sectors, and transfers the sector-unit forward channel signals to the antenna interface unit 400.

The antenna interface unit 400 couples each of the three forward channel signals from the divider 200 with a DC voltage and transfers the resultant sector-unit forward channel signals to the Butler matrix 600.

Figure 3:
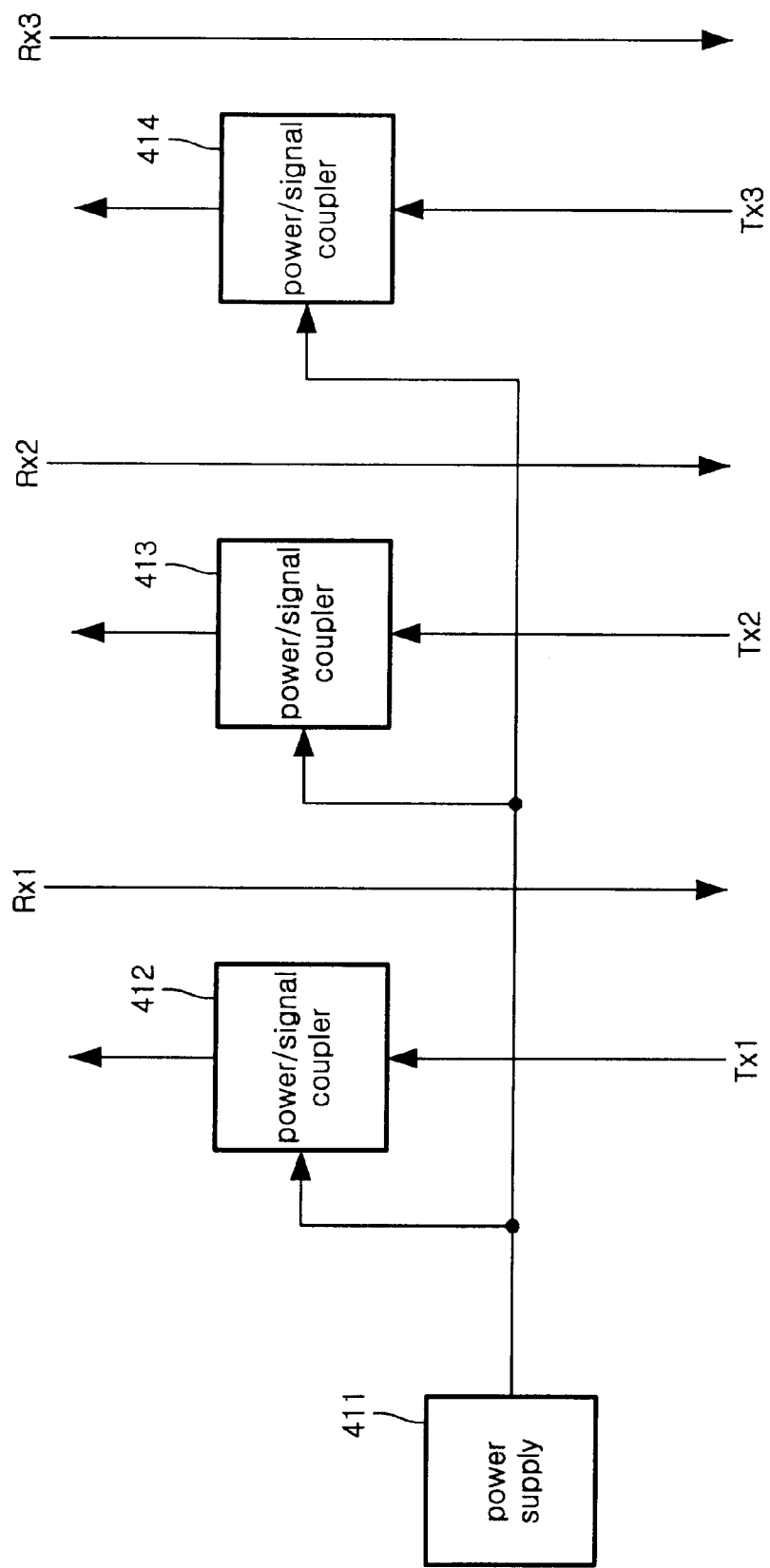
FIG. 3 is a block diagram of an embodiment of an antenna interface unit in FIG. 2.

FIG. 3 is a block diagram showing an embodiment of the antenna interface unit 400.

As shown in FIG. 3, the antenna interface unit 400 includes a power supply 411 for converting an external commercial alternating current (AC) input voltage into a DC voltage to satisfy input conditions of the active radio frequency module 700, and first to third power/signal couplers 412–414 for coupling the sector-unit forward channel signals from the divider 200 with the DC voltage from the power supply 411, respectively.

In the antenna interface unit 400 with the above-mentioned construction, the power supply 411 converts an external commercial AC input voltage into a DC voltage desired by the active radio frequency module 700 and supplies the converted DC voltage respectively to the first to third power/signal couplers 412–414. Then, the first to third power/signal couplers 412–414 couple the sector-unit forward channel signals from the divider 200 with the DC voltage from the power supply 411 and transfer the resultant forward channel signals to the outdoor Butler matrix 600, respectively.

Figure 4:
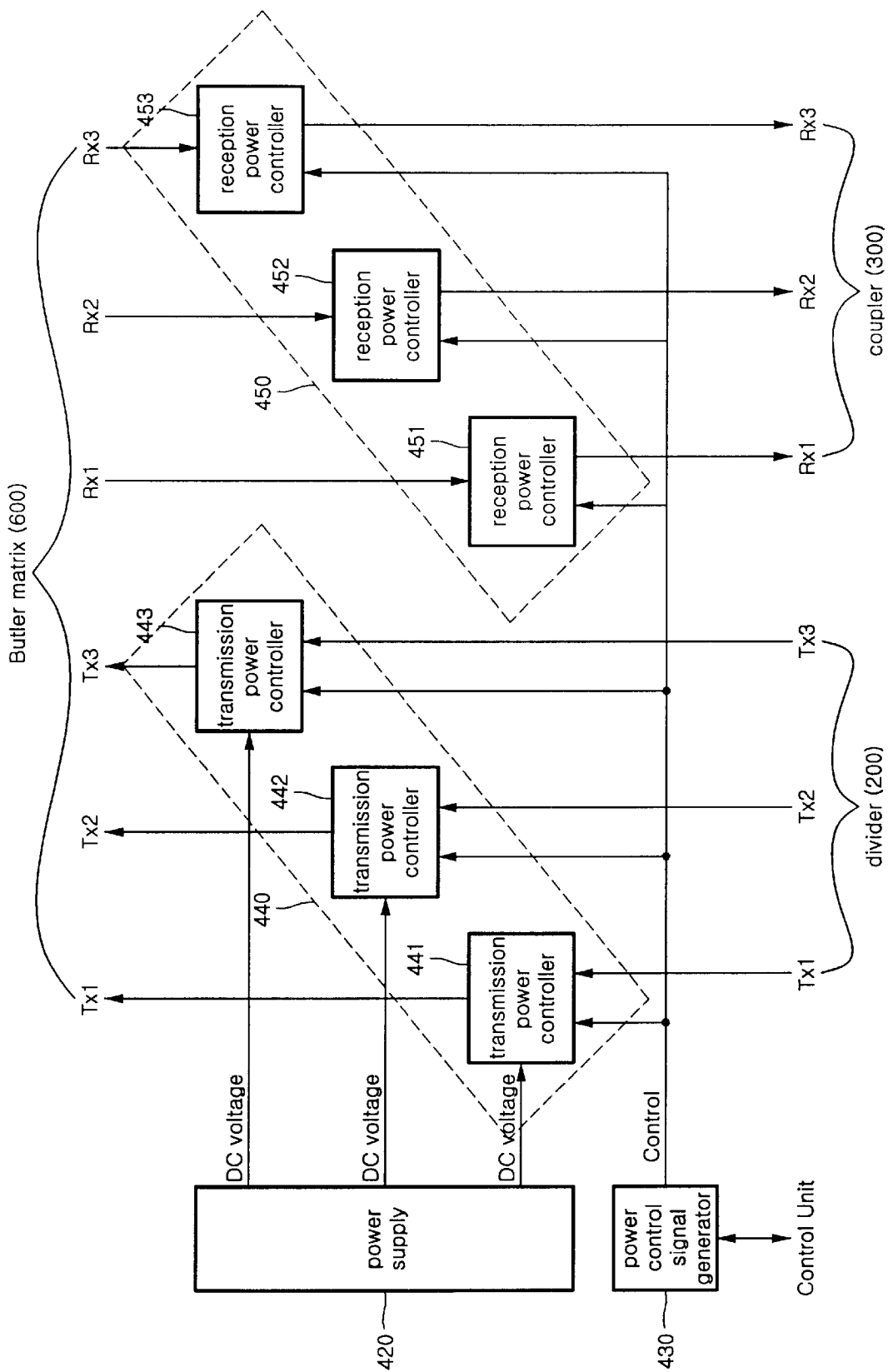
FIG. 4 is a block diagram of an alternative embodiment of the antenna interface unit in FIG. 2.

FIG. 4 is a block diagram showing an alternative embodiment of the antenna interface unit 400.

As shown in FIG. 4, the antenna interface unit 400 includes a power supply 420 for converting an external commercial AC input voltage into a DC voltage desired by the active radio frequency module 700, and a power control signal generator 430 for communicating with indoor equipment to receive transmission/reception power control values therefrom and generating transmission/reception power control signals respectively according to the received power control values. A transmission power control circuit 440 is provided to amplify the sector-unit forward channel signals from the divider 200 in response to the transmission power control signal from the power control signal generator 430, couple each of the amplified sector-unit forward channel signals with the DC voltage from the power supply 420 and transfer the resultant forward channel signals to the Butler matrix 600. A reception power control circuit 450 is provided to amplify the sector-unit reverse channel signals from the Butler matrix 600 in response to the reception power control signal from the power control signal generator 430 and transfer the resultant reverse channel signals to the coupler 300.

The transmission power control circuit 440 includes first to third transmission power controllers 441–443, each of which amplifies a corresponding one of the sector-unit forward channel signals from the divider 200 in response to the transmission power control signal from the power control signal generator 430, couples the amplified forward channel signal with the DC voltage from the power supply 420 and transfers the resultant forward channel signal to the Butler matrix 600.

Figure 5:
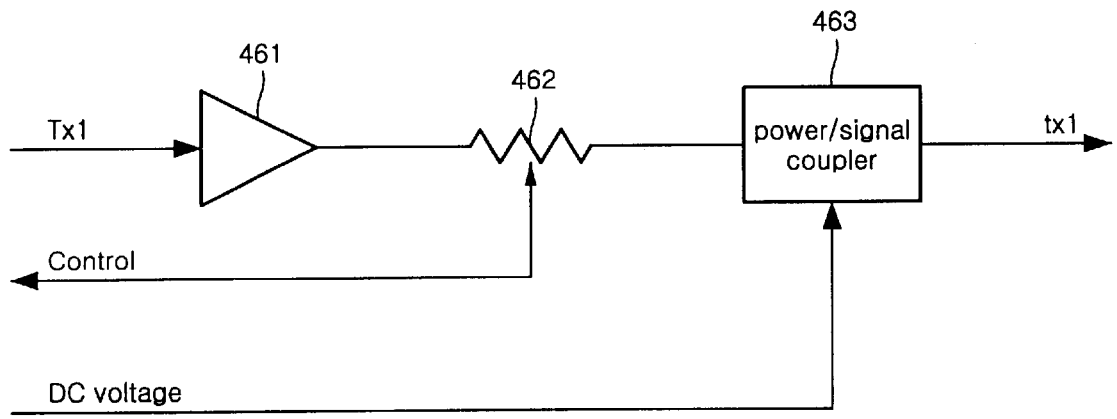
FIG. 5 is a circuit diagram of a transmission power controller in FIG. 4.

Each of the first to third transmission power controllers 441–443 includes, as shown in FIG. 5, an amplifier 461 for amplifying the corresponding sector-unit forward channel signal from the divider 200 by a fixed gain, an attenuator 462 for attenuating the amplified forward channel signal from the amplifier 461 in response to the transmission power control signal from the power control signal generator 430, and a power/signal coupler 463 for coupling the attenuated forward channel signal from the attenuator 462 with the DC voltage from the power supply 420 and transferring the resultant forward channel signal to the Butler matrix 600.

The construction and operation of the reception power control circuit 450 will be mentioned at a later time when a reverse link operation of the antenna interface unit 400 is described.

In the antenna interface unit 400 with the above-mentioned construction, on the forward link, the sector-unit forward channel signals from the divider 200 are applied respectively to the first to third transmission power controllers 441–443 in the transmission power control circuit 440.

The power supply 420 full wave-rectifies and smoothes an external commercial AC input voltage to produce a DC voltage desired by the active radio frequency module 700. Then, the power supply 420 supplies the produced DC voltage respectively to the first to third transmission power controllers 441–443.

The power control signal generator 430 communicates internally with a control unit in the indoor equipment, although not shown, to receive transmission/reception power control values therefrom. Then, the power control signal generator 430 generates transmission/reception power control signals respectively on the basis of the received power control values. Herein, the control of transmission power and reception power aims at varying transmission/reception coverages. Namely, the transmission coverage can be enlarged by maximizing the transmission power, and the reception coverage can be enlarged by maximizing the reception power.

The transmission power control signal, generated in the above manner, is applied respectively to the first to third transmission power controllers 441–443, which then control gains of the sector-unit forward channel signals from the divider 200 in response to the transmission power control signal, respectively. The first to third transmission power controllers 441–443 are the same in construction and operation and only one (for example, the first transmission power controller 441) thereof will thus be hereinafter described.

In the first transmission power controller 441, as shown in FIG. 5, the amplifier 461 amplifies a corresponding sector-unit forward channel signal (for example, an alpha sector signal) Tx1 from the divider 200 by a fixed gain of, for example, 30 dB and outputs the amplified alpha sector forward channel signal to the attenuator 462. In response to the transmission power control signal from the power control signal generator 430, the attenuator 462 attenuates the amplified alpha sector forward channel signal from the amplifier 461 variably within the limits of, for example, 15 dB. At this time, the attenuation level is determined based on the transmission power control signal from the power control signal generator 430 to be variable within the limits of 15 dB. Then, the power/signal coupler 463 couples the attenuated alpha sector forward channel signal from the attenuator 462 with the DC voltage from the power supply 420 and transfers the resultant alpha sector forward channel signal to the Butler matrix 600.

Subsequently, the outdoor Butler matrix 600 makes the sector-unit forward channel signals (i.e., alpha, beta and gamma sector signals) from the antenna interface unit 400 out of phase from one another in such a manner that the beams 810, 820 and 830 formed at the four horizontal antenna arrays 710–740 in the active radio frequency module 700 can be radiated respectively at orientation angles as shown in FIG. 2. Then, the Butler matrix 600 outputs the resultant beam forming signals to the active radio frequency module 700. The Butler matrix 600 is called a 4×4 Butler matrix with four input terminals and four output terminals, which is now commercially available. Noticeably, the Butler matrix 600 is adapted to output beam forming signals through all of the output terminals regardless of the number of input signals to the input terminals.

Then, each of the first to fourth horizontal antenna arrays 710–740 in the active radio frequency module 700 radiates each of the beam forming signals from the Butler matrix 600 as a forward channel signal at a predetermined beam width and predetermined orientation angle over the air.

Each of the first to fourth antenna arrays 710–740 includes transmission/reception antenna elements and transmission/reception amplifiers. The first to fourth antenna arrays 710–740 are the same in construction and operation and only one thereof will thus be hereinafter described. Namely, one antenna array includes a transmission amplifier, transmission band pass filter, transmission antenna, reception antenna, reception band pass filter and reception amplifier. At the current state, or the forward channel signal transmission state, the transmission amplifier amplifies the beam forming signals from the Butler matrix 600 to a predetermined power level and the transmission band pass filter filters the amplified beam forming signals at a predetermined band to remove a spurious component therefrom. Subsequently, the transmission antenna radiates each of the spurious-removed beam forming signals as a forward channel signal over the air at a predetermined beam width (for example, 30°) and predetermined orientation angle.

In other words, one antenna array radiates a forward channel signal corresponding to each of the alpha, beta and gamma sectors over a space with a width of 30°. As a result, because one antenna array has a propagation area of 90° corresponding to all of the alpha, beta and gamma sectors, the use of four antenna arrays makes it possible to cover a propagation area of a total of 360°, or 4×90°.

Next, on the reverse link, each of the four antenna arrays 710, 720, 730 and 740 in the active radio frequency module 700 receives sector-unit reverse channel signals transmitted from a service subscriber. As stated previously, the four antenna arrays 710–740 are the same in construction and operation and only one thereof will thus be hereinafter described.

In one antenna array, the reception antenna receives the sector-unit reverse channel signals transmitted from the subscriber and the reception band pass filter filters the received reverse channel signals at a predetermined band. Then, the reception amplifier amplifies the filtered reverse channel signals to a predetermined power level and transfers the amplified reverse channel signals to the following Butler matrix 600.

Herein, the Butler matrix 600 is a 4×4 Butler matrix, similarly to the transmission Butler matrix. The Butler matrix 600 receives alpha, beta and gamma signals from the active radio frequency module 700 respectively at its three input terminals, converts the received signals into reverse channel signals corresponding respectively to the alpha, beta and gamma sectors and transfers the converted signals to the antenna interface unit 400. Further, the Butler matrix 600 transfers a signal received at its remaining one input terminal to the dummy load 500.

The indoor antenna interface unit 400 transfers the sector-unit reverse channel signals from the Butler matrix 600 to the coupler 300 directly or after controlling reception powers of the reverse channel signals.

In the case where the antenna interface unit 400 has the construction shown in FIG. 3, it transfers the sector-unit reverse channel signals from the Butler matrix 600 directly to the coupler 300.

Alternatively, in the case where the antenna interface unit 400 has the construction shown in FIG. 4, it controls the reception powers of the sector-unit reverse channel signals from the Butler matrix 600 in response to the reception power control signal and then transfers the resultant reverse channel signals to the coupler 300.

In more detail, the reception power control circuit 450 includes, as shown in FIG. 4, first to third reception power controllers 451–453, each of which amplifies a corresponding one of the sector-unit reverse channel signals from the Butler matrix 600 in response to the reception power control signal from the power control signal generator 430 and transfers the amplified sector-unit reverse channel signal to the coupler 300.

Figure 6:
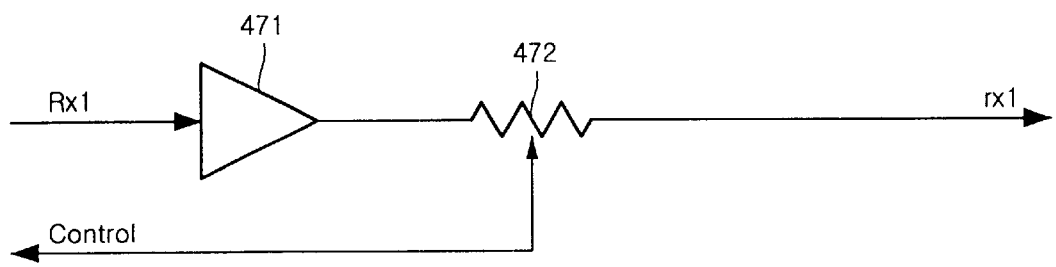
FIG. 6 is a circuit diagram of a reception power controller in FIG. 4.

Each of the first to third reception power controllers 451–453 includes, as shown in FIG. 6, an amplifier 471 for amplifying the corresponding sector-unit reverse channel signal from the Butler matrix 600 by a fixed gain, and an attenuator 472 for attenuating the amplified reverse channel signal from the amplifier 471 in response to the reception power control signal from the power control signal generator 430 and transferring the attenuated reverse channel signal to the coupler 300.

Now, a detailed description will be given of the reverse channel signal reception operation of the antenna interface unit 400 with the above-mentioned construction.

First, as stated previously, the power control signal generator 430 generates the reception power control signal on the basis of the reception power control value obtained through the internal communication with the indoor equipment.

The reception power control signal, generated in the above manner, is applied respectively to the first to third reception power controllers 451–453, which then control reception powers of the sector-unit reverse channel signals from the Butler matrix 600 in response to the reception power control signal, respectively.

The first to third reception power controllers 451–453 are the same in construction and operation and only one (for example, the first reception power controller 451) thereof will thus be hereinafter described.

In the first reception power controller 451, as shown in FIG. 6, the amplifier 471 amplifies a corresponding sector-unit reverse channel signal Rx1 from the Butler matrix 600 by fixed gain of, for example, 15 dB and outputs the amplified reverse channel signal to the attenuator 472. In response to the reception power control signal from the power control signal generator 430, the attenuator 472 attenuates the amplified reverse channel signal from the amplifier 471 variably within the limits of, for example, 15 dB and transfers the attenuated reverse channel signal to the coupler 300. Herein, the reception power control operation is variably performed within the limits of 15 dB under the control of the power control signal generator 430.

The coupler 300 couples the sector-unit reverse channel signals from the first to third reception power controllers 451–453 and transfers the resultant reverse channel signal to the transceiver 100.

The transceiver 100 down-converts the reverse channel signal (DCS: 824–849 Mhz and PCS: 1750–1780 Mhz) from the coupler 300 into an IF signal of 4.95 Mhz and sends the converted IF signal to a subsequent demodulator.

As apparent from the above description, according to the present invention, the multibeam active antennas with transmission/reception amplifiers are applied to the existing CDMA mobile communication systems such as the DCS and PCS, resulting in no need for either a high-power amplifier (HPA) for transmission or a low-noise amplifier (LNA) for reception, conventionally installed indoors. This has the effect of making the entire construction of a base transceiver station system simple.

Further, according to the present invention, the multibeam active antennas cover the propagation area with twelve sectors, each having a width of 30°. This has the effect of increasing a sectoral gain and accommodating a larger number of subscribers than conventional ones.

Moreover, according to the present invention, the transmission power and reception power are variably controlled by the additional power control function of the indoor equipment. Therefore, the transmission/reception coverages can be varied, thereby making it possible to provide an efficient service. Furthermore, in the case where the variable transmission/reception coverages are applied variably according to the topography of service areas, a more efficient service can be provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A base transceiver station with active antennas in a DMA mobile communication system, comprising:
    a transceiver installed indoors for up-converting a CDMA-modulated signal to be transmitted to a service subscriber and down-converting a signal received from the subscriber into an intermediate frequency signal;
    a divider installed indoors for dividing a forward channel signal from said transceiver into a plurality of sector-unit forward channel signals;
    a coupler for coupling a plurality of sector-unit reverse channel signals and transferring the resultant signal to said transceiver;
    antenna interface means installed indoors for appending a DC voltage to each of said sector-unit forward channel signals from said divider, transferring the resultant sector-unit forward channel signals to a Butler matrix, receiving said sector-unit reverse channel signals from said Butler matrix and transferring them to said coupler;
    said Butler matrix being installed outdoors for making said sector-unit forward channel signals from said antenna interface means out of phase from one another to produce beam forming signals, converting a reverse channel signal into said sector-unit reverse channel signals and transferring them to said antenna interface means; and
    active radio frequency means installed outdoors for radiating each of said beam forming signals from said Butler matrix at a predetermined beam width and predetermined orientation angle over the air, receiving said reverse channel signal from said subscriber, amplifying it and transferring the resultant signal to said Butler matrix.

2. The base transceiver station as set forth in claim 1, wherein said antenna interface means includes:
    a power supply for converting an external commercial AC input voltage into a DC voltage to satisfy input conditions of said active radio frequency means; and
    first to third power/signal couplers for coupling said sector-unit forward channel signals from said divider with said DC voltage from said power supply, respectively.

3. The base transceiver station as set forth in claim 1, wherein said antenna interface means includes:
    a power supply for converting an external commercial AC input voltage into a DC voltage desired by said active radio frequency means;
    a power control signal generator for communicating with indoor equipment to receive transmission/reception power control values therefrom and generating transmission/reception power control signals respectively according to the received power control values;
    transmission power control means for amplifying said sector-unit forward channel signals from said divider in response to said transmission power control signal from said power control signal generator, coupling each of the amplified sector-unit forward channel signals with said DC voltage from said power supply and transferring the resultant forward channel signals to said Butler matrix; and
    reception power control means for amplifying said sector-unit reverse channel signals from said Butler matrix in response to the reception power control signal from said power control signal generator and transferring the resultant reverse channel signals to said coupler.

4. The base transceiver station as set forth in claim 3, wherein said transmission power control means includes first to third transmission power controllers, each of said transmission power controllers amplifying a corresponding one of said sector-unit forward channel signals from said divider in response to said transmission power control signal from said power control signal generator, coupling the amplified forward channel signal with said DC voltage from said power supply and transferring the resultant forward channel signal to said Butler matrix.

5. The base transceiver station as set forth in claim 4, wherein each of said first to third transmission power controllers includes:
    an amplifier for amplifying the corresponding sector-unit forward channel signal from said divider by a fixed gain;
    an attenuator for attenuating the amplified forward channel signal from said amplifier in response to said transmission power control signal from said power control signal generator; and
    a power/signal coupler for coupling the attenuated forward channel signal from said attenuator with said DC voltage from said power supply and transferring the resultant forward channel signal to said Butler matrix.

6. The base transceiver station as set forth in claim 3, wherein said reception power control means includes first to third reception power controllers, each of said reception power controllers amplifying a corresponding one of said sector-unit reverse channel signals from said Butler matrix in response to said reception power control signal from said power control signal generator and transferring the amplified sector-unit reverse channel signal to said coupler.

7. The base transceiver station as set forth in claim 6, wherein each of said first to third reception power controllers includes:
    an amplifier for amplifying the corresponding sector-unit reverse channel signal from said Butler matrix by a fixed gain; and
    an attenuator for attenuating the amplified reverse channel signal from said amplifier in response to said reception power control signal from said power control signal generator and transferring the attenuated reverse channel signal to said coupler.

8. The base transceiver station as set forth in claim 1, wherein said active radio frequency means includes first to fourth antenna arrays horizontally arranged to form a beam radiation pattern.

9. A base transceiver station with active antennas in a CDMA mobile communication system, comprising:
   a transceiver installed indoors for up-converting a CDMA-modulated signal to be transmitted to a service subscriber and down-converting a signal received from the subscriber into an intermediate frequency signal;
   a divider installed indoors for dividing a forward channel signal from said transceiver into a plurality of sector-unit forward channel signals;
   a coupler for coupling a plurality of sector-unit reverse channel signals and transferring the resultant signal to said transceiver;
   antenna interface means installed indoors for appending a DC voltage to each of said sector-unit forward channel signals from said divider, transferring the resultant sector-unit forward channel signals to a Butler matrix, receiving said sector-unit reverse channel signals from said Butler matrix and transferring them to said coupler;
   said Butler matrix being installed outdoors for making said sector-unit forward channel signals from said antenna interface means out of phase from one another to produce beam forming signals, converting a reverse channel signal into said sector-unit reverse channel signals and transferring them to said antenna interface means; and
   active radio frequency means installed outdoors for radiating each of said beam forming signals from said Butler matrix at a predetermined beam width and predetermined orientation angle over the air, receiving said reverse channel signal from said subscriber, amplifying it and transferring the resultant signal to said Butler matrix, said active radio frequency means including first to fourth antenna arrays horizontally arranged to form a beam radiation pattern, each of said first to fourth antenna arrays including:
   a transmission amplifier for amplifying said beam forming signals from said Butler matrix to a predetermined power level;
   a transmission band pass filter for filtering the amplified beam forming signals from said transmission amplifier at a predetermined band;
   a transmission antenna for radiating each of the filtered beam forming signals from said transmission band pass filter over the air at a predetermined beam width and predetermined orientation angle; a reception antenna for receiving said sector-unit reverse channel signals from the subscriber;
   a reception band pass filter for filtering the received reverse channel signals from said reception antenna at a predetermined band; and
   a reception amplifier for amplifying the filtered reverse channel signals from said reception band pass filter to a predetermined power level and transferring the amplified.

10. The base transceiver station as set forth in claim 9, wherein said predetermined beam width is 30° in every sector and said transmission antenna has a propagation area of 90° corresponding to three sectors.

11. The base transceiver station as set forth in claim 9, wherein said antenna interface means includes:
   a power supply for converting an external commercial AC input voltage into a DC voltage to satisfy input conditions of said active radio frequency means; and
   first to third power/signal couplers for coupling said sector-unit forward channel., signals from said divider with said DC voltage from said power supply, respectively.

12. The base transceiver station as set forth in claim 9, wherein said antenna interface means includes:
   a power supply for converting an external commercial AC input voltage into a DC voltage desired by said active radio frequency means;
   a power control signal generator for communicating with indoor equipment to receive transmission/reception power control values therefrom and generating transmission/reception power control signals respectively according to the received power control values;
   transmission power control means for amplifying said sector-unit forward channel signals from said divider in response to said transmission power control signal from said power control signal generator, coupling each of the amplified sector-unit forward channel signals with said DC voltage from said power supply and transferring the resultant forward channel signals to said Butler matrix; and
   reception power control means for amplifying said sector-unit reverse channel signals from said Butler matrix in response to the reception power control signal from said power control signal generator and transferring the resultant reverse channel signals to said coupler.

13. The base transceiver station as set forth in claim 12, wherein said transmission power control means includes first to third transmission power controllers, each of said transmission power controllers amplifying a corresponding one of said sector-unit forward channel signals from said divider in response to said transmission power control signal from said power control signal generator, coupling the amplified forward channel signal with said DC voltage from said power supply and transferring the resultant forward channel signal to said Butler matrix.

14. The base transceiver station as set forth in claim 13, wherein each of said first to third transmission power controllers includes:
   an amplifier for amplifying the corresponding sector-unit forward channel signal from said divider by a fixed gain;
   an attenuator for attenuating the amplified forward channel signal from said amplifier in response to said transmission power control signal from said power control signal generator; and
   a power/signal coupler for coupling the attenuated forward channel signal from said attenuator with said DC voltage from said power supply and transferring the resultant forward channel signal to said Butler matrix.

15. The base transceiver station as set forth in claim 12, wherein said reception power control means includes first to third reception power controllers, each of said reception power controllers amplifying a corresponding one of said sector-unit reverse channel signals from said Butler matrix in response to said reception power control signal from said power control signal generator and transferring the amplified sector-unit reverse channel signal to said coupler.

16. The base transceiver station as set forth in claim 15, wherein each of said first to third reception power controllers includes:

an amplifier for amplifying the corresponding sector-unit reverse channel signal from said Butler matrix by a fixed gain; and an attenuator for attenuating the amplified reverse channel signal from said amplifier in response to said reception power control signal from said power control signal generator and transferring the attenuated reverse channel signal to said coupler.

* * * * *